(12) United States Patent
Hsieh et al.

(10) Patent No.: US 7,822,020 B2
(45) Date of Patent: Oct. 26, 2010

(54) VOIP MONITORING SYSTEM AND VOIP MONITORING METHOD

(75) Inventors: An-Nan Hsieh, Taipei Hsien (TW); Hai-Bin Su, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 75 days.

(21) Appl. No.: 12/180,242

(22) Filed: Jul. 25, 2008

(65) Prior Publication Data

US 2009/0296902 A1 Dec. 3, 2009

(30) Foreign Application Priority Data

May 30, 2008 (CN) .................. 2008 1 0301856

(51) Int. Cl.
*H04L 12/66* (2006.01)
(52) U.S. Cl. .................. 370/352; 370/353; 379/93
(58) Field of Classification Search .......... 370/352, 370/241, 389, 222, 390, 356, 353, 395, 400, 370/401; 725/139, 105; 709/203, 223, 219, 709/208, 224; 455/560, 445, 425, 519; 379/88, 379/201, 45, 88.04, 93; 707/104; 726/25
See application file for complete search history.

(56) References Cited

U.S. PATENT DOCUMENTS

| | | | |
|---|---|---|---|
| 7,099,922 B2* | 8/2006 | Pospesel et al. ............. | 709/208 |
| 2003/0200311 A1* | 10/2003 | Baum ......................... | 709/224 |
| 2003/0235279 A1* | 12/2003 | Richomme ............... | 379/88.15 |
| 2004/0003070 A1* | 1/2004 | Fernald et al. .............. | 709/223 |
| 2005/0239485 A1* | 10/2005 | Kundu et al. ................. | 455/519 |
| 2006/0025141 A1* | 2/2006 | Marsh et al. ................. | 455/445 |
| 2006/0193455 A1* | 8/2006 | Light et al. ............ | 379/201.01 |
| 2006/0205436 A1* | 9/2006 | Liu et al. ..................... | 455/560 |
| 2006/0206941 A1* | 9/2006 | Collins ........................ | 726/25 |
| 2006/0285535 A1* | 12/2006 | Metcalf et al. .............. | 370/352 |
| 2007/0092070 A1* | 4/2007 | Croy et al. ..................... | 379/45 |
| 2007/0121596 A1* | 5/2007 | Kurapati et al. ............. | 370/356 |
| 2007/0130599 A1* | 6/2007 | Monroe ....................... | 725/105 |
| 2008/0130842 A1* | 6/2008 | Johri et al. ............... | 379/88.04 |
| 2008/0194250 A1* | 8/2008 | Byun ........................... | 455/425 |
| 2009/0059798 A1* | 3/2009 | Lee et al. ..................... | 370/241 |
| 2009/0077613 A1* | 3/2009 | Edwards et al. ............. | 725/139 |

\* cited by examiner

*Primary Examiner*—Pankaj Kumar
*Assistant Examiner*—Prenell P Jones
(74) *Attorney, Agent, or Firm*—D. Austin Bonderer

(57) ABSTRACT

A Voice over Internet Protocol (VoIP) system includes two or more VoIP terminals, a monitoring server (30), and a soft switch device (10). The soft switch is capable of determining whether or not phone number associated with at least one of the two or more VoIP terminals is predetermined to be monitored, amending information associated with communication between the two or more VoIP terminals, and establishing the communication between the two or more VoIP terminals through the monitoring server. The monitoring server is capable of reading voice data packets sent between the two or more VoIP terminals.

2 Claims, 2 Drawing Sheets

VOIP MONITORING SYSTEM AND VOIP MONITORING METHOD

BACKGROUND

1. Field of the Invention

The present invention relates to monitoring systems and monitoring methods, and more particularly to a VoIP monitoring system and a VoIP monitoring method.

2. Description of Related Art

Nowadays, Voice over Internet Protocol (VoIP) is becoming an increasingly popular method of communication in a phone system. Real-time Transmission Protocol (RTP) is generally used to send voice data packets in the VoIP phone system.

Sometimes, it is necessary for a security department to monitor conversations on a VoIP phone system. However, there is no device or method to isolate the particular RTP data packets for monitoring the conversations on the VoIP phone system at present. As a result, it is difficult for the security department to find particular conversations they want to monitor.

What is needed, therefore, is a VoIP monitoring system and a VoIP monitoring method, which allows efficient monitoring of a VoIP phone system.

DETAILED DESCRIPTION

Figure 1:
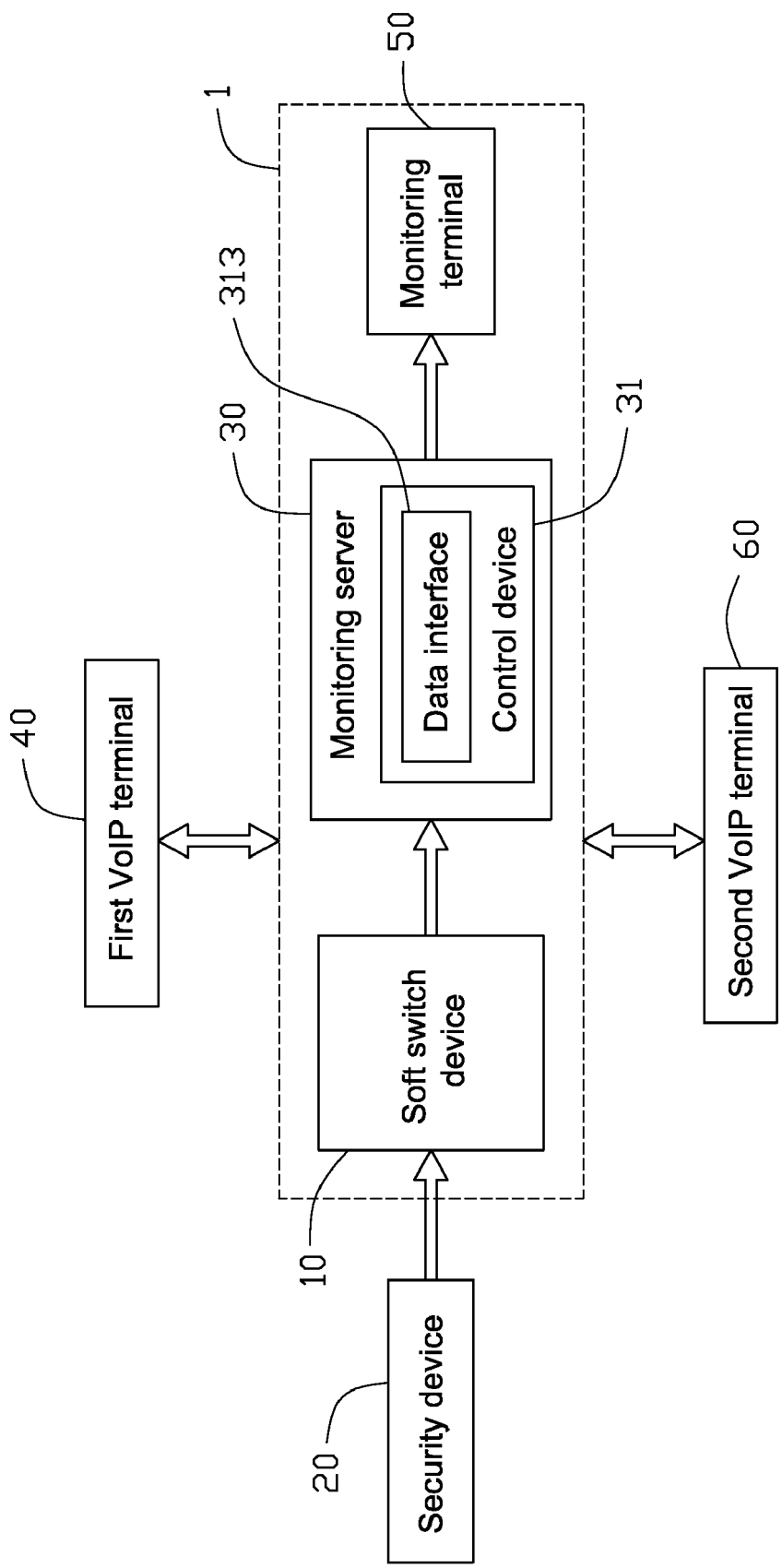
FIG. 1 is a relational diagram between different modules within a VoIP monitoring system in the present invention.

Referring to FIG. 1, a VoIP monitoring system 1 of an embodiment of the present invention is provided for monitoring the call of specific users determined by a security department. The monitoring system 1 includes a soft switch device 10, a monitoring server 30 connected to the soft switch device 10 through the Internet, and a monitoring terminal 50 connected to the monitoring server 30. The soft switch device 10 is connected to a security device 20 of the security department. The monitoring system 1 is respectively connected to a first VoIP terminal 40 and a second VoIP terminal 60 through the Internet. The first VoIP terminal 40 can communicate with the second VoIP terminal 60 through the Internet.

The security device 20 stores many phone numbers targeted for monitoring, including the phone numbers of specific users determined by the security department. The first VoIP terminal 40 and the second VoIP terminal 60 both include at least one VoIP phone terminal. The soft switch device 10 is capable of receiving the call information transmitted from the first VoIP terminal 40 or the second VoIP terminal 60 through the Internet, subsequently determining whether the call information exists in the list of phone numbers targeted for monitoring. The call information includes the phone numbers and the transmission paths of the first VoIP terminal 40 and the second VoIP terminal 60. When the soft switch device 10 receives the call information, it will compare the phone number of the first VoIP terminal 40 and/or the second VoIP terminal 60 with the phone numbers targeted for monitoring. If the phone number exists in the list of phone numbers targeted for monitoring, the soft switch device 10 will amend the call information to change the transmission paths, thereby transmitting the voice data packets from the first VoIP terminal 40 and the second VoIP terminal 60 through the monitoring server 30. The monitoring server 30 includes a control device 31 having a voice coding and decoding function. The control device 31 includes a data interface 313 for transmitting the audible voice signals. The monitoring server 30 is connected to the soft switch device 10 through the Internet. The monitoring server 30 can transform voice data packets to PCM (Pulse Code Modulation) voice signals through the control device 31, and transmit the PCM voice signals to the monitoring terminal 50 through the data interface 313. The monitoring terminal 50 is provided for monitoring and recording the audible voice signals from the data interface 313 of the monitoring server 30. The monitoring server 30 is also capable of transmitting the voice data packets to the first VoIP terminal 40 and the second VoIP terminal 60, and as a result, it will not affect the communication between the first VoIP terminal 40 and the second VoIP terminal 60.

Before the first VoIP terminal 40 calls the second VoIP terminal 60, the security device 20 will transmit the phone numbers targeted for monitoring to the soft switch device 10. When the first VoIP terminal 40 calls the second VoIP terminal 60, the first VoIP terminal 40 will transmit the call information having the phone numbers and the transmission paths of the first VoIP terminal 40 and the second VoIP terminal 60 to the soft switch device 10. The soft switch device 10 determines whether the call information from the first VoIP terminal 10 exists in the list of numbers targeted for monitoring. If the phone number of the first VoIP terminal 40 and/or the second VoIP terminal 60 exist in the list of phone numbers targeted for monitoring, the soft switch device 10 will amend the call information to change the transmission paths of the first VoIP terminal 40 and the second VoIP terminal 60 and deliver the monitoring command to the monitoring server 30. The communication between the first VoIP terminal 40 and the second VoIP terminal 60 will be established based on the amended call information. The voice data packets from the first VoIP terminal 40 and the second VoIP terminal 60 are transmitted through the monitoring server 30. The monitoring server 30 transforms the voice data packets to the PCM voice signals through the control device 31, and transmits the audible voice signals to the monitoring terminal 50 through the data interface 313. The monitoring terminal 50 will monitor and record the audible voice signals. If the phone number of the first VoIP terminal 40 and/or the second VoIP terminal 60 do not exist in the list of phone numbers targeted for monitoring, the soft switch device 10 will establish the communication between the first VoIP terminal 40 and the second VoIP terminal 60 directly without amending the call information.

Figure 2:
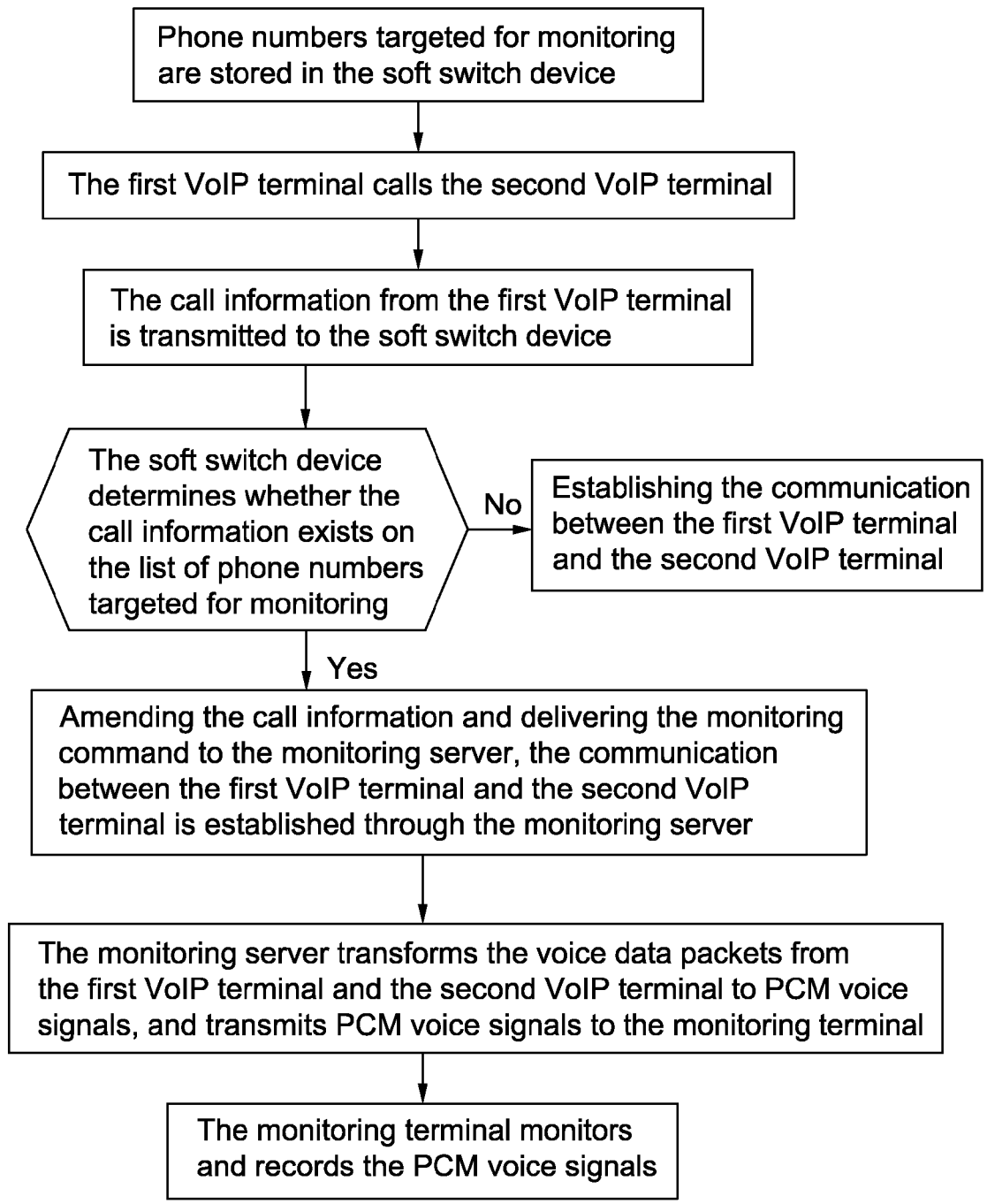
FIG. 2 is a flow chart of a VoIP monitoring method in the present invention.

Referring to FIG. 2, a VoIP monitoring method includes the following steps:

Step 1: Phone numbers targeted for monitoring are stored in the soft switch device 10;

Step 2: The first VoIP terminal 40 calls the second VoIP terminal 60 through the Internet;

Step 3: The call information from the first VoIP terminal 40 is transmitted to the soft switch device 10 through the Internet;

Step 4: The soft switch device 10 determines whether the call information from the first VoIP terminal 40 exists on the list of phone numbers targeted for monitoring;

Step 5: If a number is recognized, the soft switch device 10 will amend the call information and deliver the monitoring command to the monitoring server 30, the communication between the first VoIP terminal 40 and the second VoIP terminal 60 will be established through the monitoring server 30;

Step 6: The monitoring server 30 transforms the voice data packets from the first VoIP terminal 40 and the second VoIP terminal 60 to the PCM voice signals through the control device 31, and transmits the audible voice signals to the monitoring terminal 50 through the data interface 313;

Step 7: The monitoring terminal 50 monitors and records the PCM voice signals;

Step 8: If the call information does not exist in the list of phone numbers targeted for monitoring, the soft switch device 10 will establish the communication between the first VoIP terminal 40 and the second VoIP terminal directly.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A Voice over Internet Protocol (VoIP) system, the system comprising:

two or more VoIP terminals;

a monitoring server;

a soft switch device;

wherein the soft switch is capable of determining whether or not phone number associated with at least one of the two or more VoIP terminals is predetermined to be monitored, amending information associated with communication between the two or more VoIP terminals, and establishing the communication between the two or more VoIP terminals through the monitoring server; and the monitoring server is capable of reading voice data packets sent between the two or more VoIP terminals;

wherein the soft switch device is connected to a security device, and the soft switch device is capable of transmitting phone numbers targeted for monitoring to the security device;

wherein the monitoring server is capable of transforming the voice data packets to audible voice signals, and transmitting the audible voice signals to a monitoring terminal, the monitoring server comprises a control device being capable of transforming the voice data packets to the audible voice signals, the control device comprises a data interface being capable of transmitting the audible voice signals to the monitoring terminal, the audible voice signals are Pulse Code Modulation voice signals.

2. A Voice over Internet Protocol (VoIP) method comprising:

attempting a communication between two or more VoIP terminals;

determining whether at least one of the two or more VoIP terminals exist on a predetermined list of VoIP terminals selected for monitoring;

amending information associated with the communication, and delivering a monitoring command to a monitoring server by a soft switch device;

establishing the communication through the monitoring server;

reading voice data packets from the communication;

playing the voice data packets as audible voice signals by a monitoring terminal;

transforming the voice data packets to the audible voice signals by a control device of the monitoring server, and transmitting the audible voice signals to the monitoring terminal by a data interface of the control device;

monitoring and recording the audible voice signals from the monitoring server by the monitoring terminal.

* * * * *